United States Patent Office 3,494,574
Patented Feb. 10, 1970

3,494,574
FEED-REEL SHAFT IN A MINIATURE MOVIE PROJECTOR CAPABLE OF REVERSAL PROJECTION
Shigeo Wakahara, Yokohama-shi, Japan, assignor to Nippon Kogaku K.K., Chuo-ku, Tokyo, Japan, a corporation of Japan
Filed Apr. 2, 1968, Ser. No. 718,153
Claims priority, application Japan, Apr. 15, 1967, 42/31,613
Int. Cl. G11b 15/26
U.S. Cl. 242—206
5 Claims

ABSTRACT OF THE DISCLOSURE

This invention relates to the structure of a feed-reel shaft of a miniature movie projector capable of reversal projection which comprises fixing a flange drum on a feed-reel connected to a driving mechanism through a ratchet, cylindrically fitting the drum and the reel receiving member, making the fitting surfaces thereof into the friction transmitting surface (the surface which transmits driving power by means of friction). The end surface of the flange portion of the drum and the facing end surface of the reel receiving member are tapered to form a V-shaped peripheral groove between the two end surfaces. An intermediate friction wheel is provided for selectively engaging and disengaging the V-shaped peripheral groove to generate relatively weak and almost constant winding power when the reversal projection is carried out, and when rewinding is carried out relatively strong winding power is generated.

---

This invention relates to an improvemen of feed-reel shaft of a miniature movie projector capable of reversal projection.

In miniature movie projectors capable of reversal rotation, it is necessary for the feed-reel shaft to wind up the film when reversal projection is done, and when rewinding is made it is also necessary for the feed-reel to take up the film and the winding power can be relatively weak when the reversal projection is carried out. When rewinding is done, quick rewinding is demanded, and therefore the winding power required in case of rewinding must be considerably stronger. However, no consideration was paid to this point in the conventional devices.

The object of this invention is to provide a feed-reel shaft of simple structure according to which when the reversal projection is done, relatively weak but a constant winding power is generated, and when rewinding is done, relatively strong winding power is generated.

The characteristic features of this invention reside in that in a miniature movie projector capable of reversal rotation, a flange drum is fixed on the feed-reel shaft connected to the driving mechanism through a ratchet mechanism, and the drum and reel receiving base are cylindrically fitted, and at the same time the fitting surface thereof is made into a friction transmitting surface, i.e. the surface to transmit power through friction, and the end surfaces of the flange portion of the drum and the facing end surface of the receiving member are tapered to form between them a V-shaped peripheral groove, an intermediate friction wheel being provided to engage and disengage the end portions forming the peripheral groove.

The present invention will be described more in detail referring to an illustrative embodiment shown in the drawing, in which.

Figure 1:
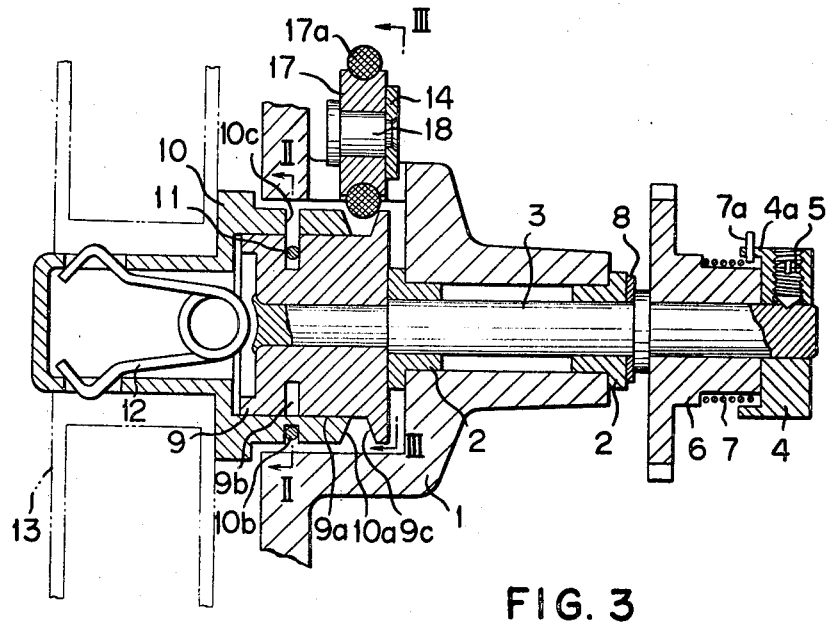
FIG. 1 is a vertical cross sectional view of the feed-reel shaft of this invention, and in the drawing, II—II portion is shown by developing the cross section in the rectangular direction (see I—I cross section of FIG. 2)
Figure 2:
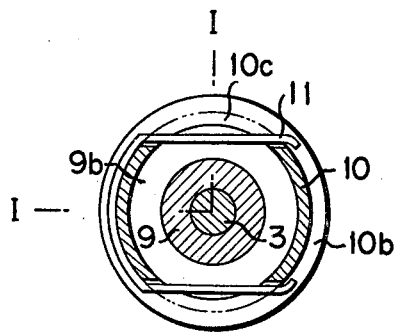
FIG. 2 is a cross sectional view across II—II line of FIG. 1.

In FIG. 1, 1 is the main body of a movie projector, 2 is a bearing member, 3 is a feed-reel supported rotatably by said bearing member 2, and at one end thereof a cap 4 having a notch 4a at a part thereof is fixed by means of a screw 5; 6 is a driving gear rotatably fitted to the feed-reel shaft 3, and is connected to the conventional film driving mechanism (not shown), 7 is a coil spring precisely fitted to the boss portion of the driving gear 6, and one end 7a thereof is fixed within the notch 4a to form the free wheel clutch which operates only in the film winding direction (the so called rewinding direction) when the reversal projection is done, 8 is a spring washer, 9 is a drum fixed on the other end of the feed-reel shaft 3, and the external cylindrical surface 9a is made into the friction transmitting surface of high friction coefficient, and fine groove 9b is formed in the center thereof. At one end thereof, the flange portion whose left surface 9c is tapered, is formed, 10 is a reel receiving member formed in a cylinder, and one end portion 10a is tapered. The internal surface thereof is fitted to the friction transmitting surface 9a, and on the external peripheral surface thereof, fine groove 10b corresponding to the fine groove 9b on the drum is formed, and at the same time the two facing portions 10c are deeply cut through the internal surfaces thereof. The two tapered surfaces 9c and 10a cooperate to form a V-shaped groove for a friction wheel 17 about which it is described hereinafter; 11 is a channel shaped pin as is shown in FIG. 2, and in said portion 10c, said wire material is inserted into the two fine grooves 9b and 10b, to perform the role to stop the receiving member 10 to be escaped, 12 is an elastic member for stopping reel, 13 is a feed-reel, 14 is a rocking lever rotatably supported by a shaft 15 and is biased always in the counter clockwise direction by a spring 16 (see FIG. 3), and in case of the ordinary projection as well as the reversal projection, the moving plate 14 is retained at the position of FIG. 1 and FIG. 3 by the conventional means (not shown), and in case of rewinding it is press-contacted to the V letter form groove by the force of the spring 16. Element 17 is the intermediate frictional wheel with the rubber ring 17a mounted on the outer periphery thereof, and it is rotatably supported on a shaft 18 fixed in the rocking lever 14.

The structure of the embodiment of this invention has such a structure as given above, and when the ordinary projection is made, the driving gear 6 is rotated in the normal winding direction, but because the rotating direction is in such a direction as to loosen the coil spring 7, the rotation is not transmitted to the feed-reel shaft 3, and therefore the members from the shaft 3 to the reel receiving member 10 can be freely rotated, and when the film is moved by the film transmitting means, the ordinary projection can be made. And in this case, when the rotation of the feed reel 13 is made greater than the rotation of the driving gear 6 for any reason, the coil spring 7 brings about binding effect, but since the safety operation is carried out as the reel receiving member 10 slips between the same and the drum 9, so that there is no danger that the respective members should be damaged.

When the reversal projection is made, the driving gear 6 is reversally rotated in the direction for binding the coil spring 7, and the rotation thereof is transmitted to the reel shaft 3 through the cap 4 to wind up the film. In this case, the force to rotate the reel receiving member 10 is determined in proportion to the diameter and friction coefficient of the friction transmitting surface 9a, the weights of the receiving member 10 and the reel 13, and the weight of the film wound on the reel 13 (determined by the diameter of the wound film), and in addition to that, the film winding force is changed in counter proportion to the diameter of the wound film on the reel 13. Therefore when these factors are appropriately selected in relation to the change of weight generated by the change of the diameter and weight of the wound film, it is possible to obtain the almost constant film winding power against the change of the diameter of the wound film of the reel.

Figure 3:
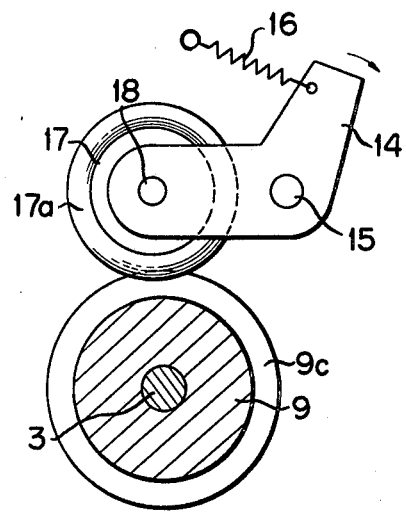
FIG. 3 is a cross sectional view across III—III line of FIG. 1.

The above explained operations are carried out with the assumption that the intermediate friction wheel 17 is at the escape position as is shown in FIG. 3, but in case of film rewinding, the holding of the friction wheel 17 at its escape position is firstly released, and by the force of the spring 16, it abuts the V-shaped groove 9c, 10a, and then the driving gear 6 is rotated in the rewinding direction. In other words, when the friction wheel 17 abuts the V-shaped groove 9c, 10a, the rotation of the reel shaft 3 given by the driving gear 6 is transmitted to the receiving member 10 by the friction given to the tapered surface 10a of the receiving member 10 through the rubber ring 17a of the friction wheel 17 from the tapered surface 9c of the drum in addition to the friction of the friction transmitting surface 9a of the drum 9. Thus, the rotating power of the reel receiving member 10 is greatly increased, and it is possible to carry out a high speed rewinding.

Since the relation between the drum and the reel receiving member is relative, and therefore the receiving member can be inserted into the inside of the drum, or the friction transmitting surface can be provided on the receiving member.

As mentioned so far, when this invention is used, it is possible to retain the film winding force to be almost constant against the diameter of the wound film on the reel when the reversal rotation is carried out, and at the same time when the film is rewound, a high speed rewinding can be done by the strong winding force. In addition, when the normal projection is done, said means works as the safety means directly, and therefore the structure is simple and practical, and from this standpoint this invention is advantageous.

What is claimed is:

1. A feed-reel driving mechanism in a movie projector capable of reversal projection, comprising
    a driven shaft connected to the driving mechanism of the projector through a free wheel clutch for rotating the driven shaft in only one direction,
    a drum secured to the driven shaft and formed with a flange at one end having a tapered surface,
    a reel receiving member having a cylindrical portion and a reel receiving portion projecting from the cylindrical portion, the inner surface of the cylindrical portion being frictionally mounted on the peripheral surface of the drum,
    a tapered surface on one end of the cylindrical portion and facing the tapered surface of the drum to form therewith a V-shaped peripheral groove,
    a rockable lever,
    a friction wheel rotatably mounted on the rockable lever adapted to engage the tapered surfaces of the V-shaped groove by the rockable lever to form a friction clutch for rotating the reel receiving member with the drum, the reel receiving member being rotated by the friction between the outer peripheral surface of the drum and the inner surface of the cylindrical portion of the reel receiving member when the rockable lever disengages the friction wheel from the surfaces of the V-shaped groove.

2. A feed reel driving mechanism according to claim 1, wherein grooves are formed in the drum and the cylindrical portion of the reel receiving member, and a pin is inserted in said grooves to prevent relative axial movement therebetween.

3. A feed reel driving mechanism according to claim 2, wherein the groove in the drum is a peripheral groove and the grooves in the cylindrical portion register with the drum groove, and wherein the pin is channel shaped and inserted in the drum and cylindrical portion grooves.

4. A feed reel driving mechanism according to claim 1, wherein a rubber ring is mounted on the friction wheel.

5. A feed reel driving mechanism according to claim 1, wherein the rockable lever is spring biased in a direction to engage the friction wheel with the surface of the V-shaped groove.

References Cited

UNITED STATES PATENTS

| | | | |
|---|---|---|---|
| 2,627,381 | 2/1953 | Borberg | 242—55.14 |
| 2,718,361 | 9/1955 | Evraets | 242—55.11 |
| 2,973,913 | 3/1961 | Thevenaz | 242—55.14 |

LEONARD D. CHRISTIAN, Primary Examiner

U.S. Cl. X.R.

352—173